(12) United States Patent
Erickson et al.

(10) Patent No.: US 7,762,054 B2
(45) Date of Patent: Jul. 27, 2010

(54) THERMALLY POWERED TURBINE INLET AIR CHILLER HEATER

(76) Inventors: Donald Charles Erickson, 1704 S. Harbor La., Annapolis, MD (US) 21401; Gopalakrishnan Anand, 9609 Splendid View, Ellicott City, MD (US) 21042

( * ) Notice: Subject to any disclaimer, the term of this patent is extended or adjusted under 35 U.S.C. 154(b) by 0 days.

(21) Appl. No.: 12/221,026

(22) Filed: Jul. 30, 2008

(65) Prior Publication Data

US 2009/0049836 A1 Feb. 26, 2009

Related U.S. Application Data

(60) Provisional application No. 60/965,691, filed on Aug. 21, 2007.

(51) Int. Cl.
*F02G 3/00* (2006.01)
(52) U.S. Cl. ...................... 60/39.093; 60/728
(58) Field of Classification Search ............... 60/39.093, 60/39.511, 728
See application file for complete search history.

(56) References Cited

U.S. PATENT DOCUMENTS

| | | | |
|---|---|---|---|
| 2,584,232 A * | 2/1952 | Sedille | 60/39.17 |
| 3,277,660 A * | 10/1966 | Kemper et al. | 62/116 |
| 3,422,800 A * | 1/1969 | La Haye | 122/7 R |
| 3,703,807 A * | 11/1972 | Rice | 60/39.182 |
| 3,796,045 A | 3/1974 | Foster-Pegg | |
| 4,328,666 A * | 5/1982 | Cummins, Jr. | 60/39.093 |
| 4,942,734 A * | 7/1990 | Markbreiter et al. | 60/783 |
| 5,669,217 A | 9/1997 | Anderson | |
| 5,782,093 A | 7/1998 | Yamashita | |
| 6,027,304 A * | 2/2000 | Arar et al. | 415/116 |
| 6,457,315 B1 | 10/2002 | Lee et al. | |
| 6,584,793 B2 * | 7/2003 | Fukushima et al. | 62/238.3 |
| 6,718,792 B1 * | 4/2004 | Sarkisian et al. | 62/324.2 |
| 6,739,119 B2 * | 5/2004 | Erickson | 60/39.53 |
| 7,007,484 B2 | 3/2006 | Stegmaler et al. | |
| 2002/0066265 A1 * | 6/2002 | Tsuji | 60/39.182 |
| 2004/0139747 A1 * | 7/2004 | Erickson | 60/772 |
| 2006/0037337 A1 | 2/2006 | Lear et al. | |
| 2007/0240400 A1 * | 10/2007 | Smith et al. | 60/39.182 |
| 2009/0031999 A1 * | 2/2009 | Erickson | 123/563 |

OTHER PUBLICATIONS

Winter Calvert, Prevent Damage to Gas Turbines From Ice Ingestion, Power, Oct. 1994, pp. 73-75.

* cited by examiner

*Primary Examiner*—Michael Cuff
*Assistant Examiner*—Phutthiwat Wongwian

(57) ABSTRACT

An addition to the air compressor of a combustion turbine system is disclosed, which chills the inlet air on warm days. The same equipment with minimal modification is used to prevent inlet air icing conditions on cold days. Referring to FIG. 1, inlet air conditioner heat exchanger 3 supplies conditioned (chilled or heated) air to the combustion turbine, and heat recovery unit 1 supplies turbine exhaust heat to ammonia absorption refrigeration unit 2. Control valves 5, 6, 7, and 8 selectively supply either chilling refrigerant liquid or heating vapor from AARU 2 to conditioning heat exchanger coil 3.

5 Claims, 3 Drawing Sheets

US 7,762,054 B2

THERMALLY POWERED TURBINE INLET AIR CHILLER HEATER

CROSS-REFERENCE TO RELATED APPLICATIONS

The present application claims the benefit of U.S. Provisional Patent Application 60/965,691 filed on 21 Aug. 2007, which is hereby incorporated by reference in its entirely.

STATEMENT REGARDING FEDERALLY SPONSORED RESEARCH AND DEVELOPMENT

Not Applicable

BACKGROUND OF THE INVENTION

Combustion turbines benefit substantially from chilling the inlet air on warm days. Both capacity and efficiency improve. The improvements are maximized by using turbine waste heat to supply the chilling, in lieu of mechanical power. Examples of this are found in U.S. Pat. Nos. 6,739,119; 6,457,315; and 5,782,093.

As the inlet air accelerates in the bellmouth, it experiences adiabatic cooling. At inlet temperatures below about 40° F., such cooling of the air can lead to potentially harmful icing whenever the relative humidity is above about 70%. Accordingly, high performance turbines advantageously have means for heating such cold, moist air. Only about 10 to 15° F. temperature increase is required to reduce the relative humidity from 100% to below 70% when the ambient temperature is 40° F. or lower.

Prior art turbine inlet air heaters have used electric resistance heating, compressor bleed air, steam heating, exhaust heated air, and the like, with attendant capital cost and operating cost.

BRIEF SUMMARY OF THE INVENTION

It has now been discovered that it is possible to minimally modify a thermally-activated inlet air chiller for the compressor of a combustion turbine system such that it can supply the inlet air heating as well. The same inlet air exchanger is used, and the same waste heat recovery exchanger is used. The same working fluid is also used. All that is required is one or more modified or additional control mechanisms, as disclosed below. The disclosure applies to intercooled combustion turbines as well as single compressor models, using either liquid or gaseous fuel.

DETAILED DESCRIPTION OF THE INVENTION

There are several ways the thermally powered compressor inlet air chilling system can be modified to add an air heating function, as shown by the following examples.

Figure 1:
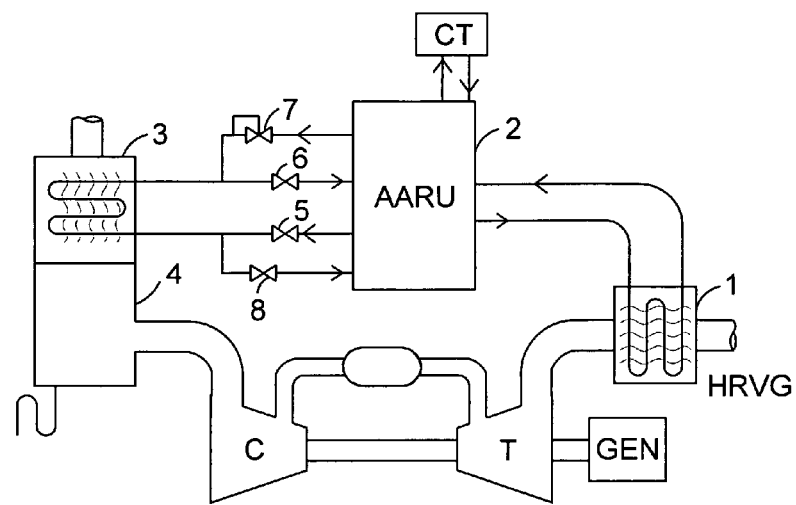
FIG. 1 is an overview of the combustion turbine plus the waste heat powered inlet air chiller, and including one preferred modification for converting the chiller to a heater when desired.

FIG. 1 is a schematic flowsheet of a combustion turbine system including a thermally activated inlet air chilling system. In addition to the compressor, combustor, and expansion turbine, the system is comprised of an exhaust heat recovery unit 1, which supplies turbine exhaust heat to the thermally activated system 2; and an inlet air exchanger 3, that chills the inlet air with refrigerant produced in the thermally activated system. A water separator and demister 4 is located at the outlet of the exchanger, to prevent water droplets from entering the compressor. In normal chilling operation, a liquid refrigerant supply valve 5, e.g. an expansion valve, supplies liquid refrigerant to the cold end of the exchanger, and vapor from the warm end is routed back to the thermally activated system. On cold days, when the thermally powered chiller/heater unit is shifted to heating mode, the liquid supply 5 and vapor return 6 valves are shut. Higher pressure vapor is controllably supplied through an added vapor valve 7, plus condensate is removed from the exchanger via a new liquid valve 8.

Figure 2:
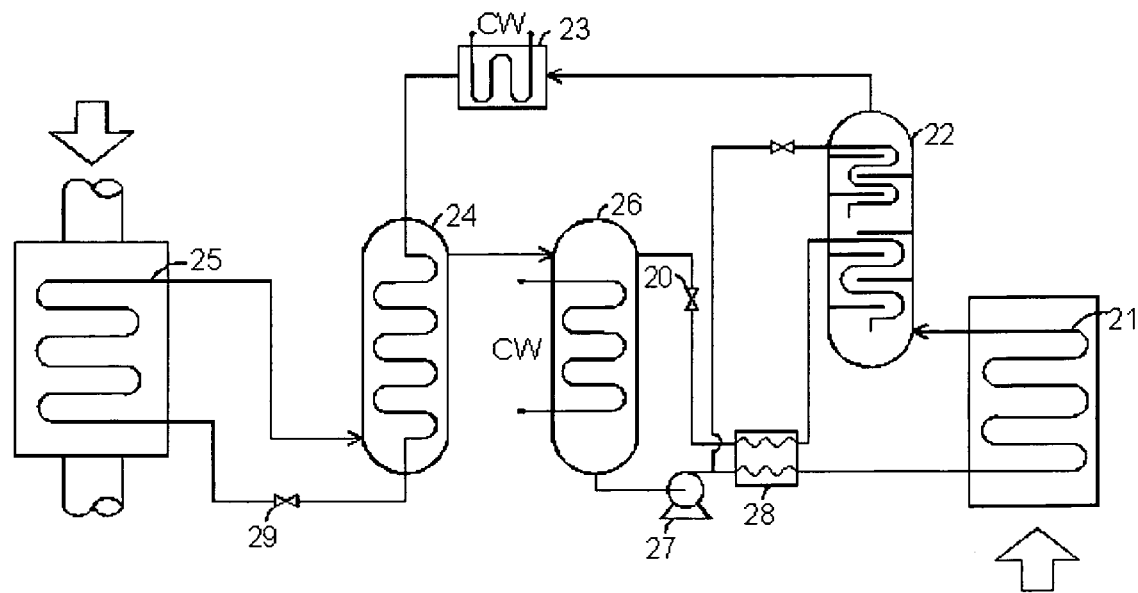
FIG. 2 presents details of one preferred configuration of the waste heat powered chiller.
Figure 3:
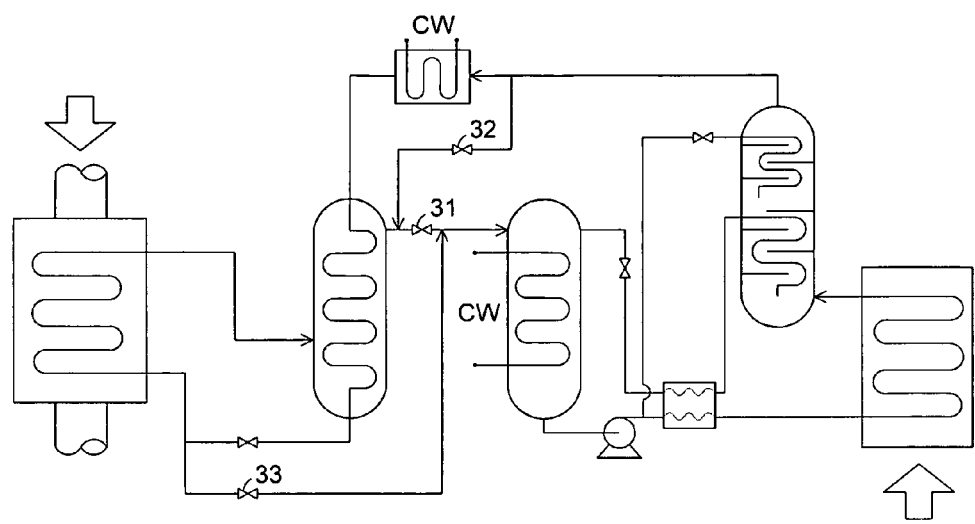
FIG. 3 illustrates one preferred modification to the chiller to enable it to convert to heating mode.

FIG. 2 is a schematic flowsheet of one preferred arrangement of a turbine waste heat activated ammonia absorption refrigeration unit adapted to supply chilling to the turbine inlet air. The AARU is comprised of solution control valve 20, heat recovery coil 21, rectifier 22, condenser 23, refrigerant heat exchanger 24, air heat exchange coil 25, absorber 26, solution pump 27, solution heat exchanger 28, and refrigerant expansion valve 29. FIG. 3 illustrates one preferred set of modifications to the FIG. 2 flowsheet in order to provide in addition the inlet air heating capability. A vapor valve 31 interrupts the normal vapor path back to the absorber. A vapor control valve 32 supplies higher pressure vapor to the inlet air heat exchanger, at a pressure high enough to maintain the desired inlet air temperature (about 42° F. or about 10° F. above ambient, whichever is lower); and a liquid control valve 33 drains condensate from the exchanger back to the absorber. In chilling operation using ammonia as the refrigerant, the pressure in the exchanger will normally be maintained between 36 and 55 psig. During heating operation, the pressure may be as high as about 75 psig, to produce 42° F. air, whereas the pressure may be much lower on very cold days.

Figure 4:
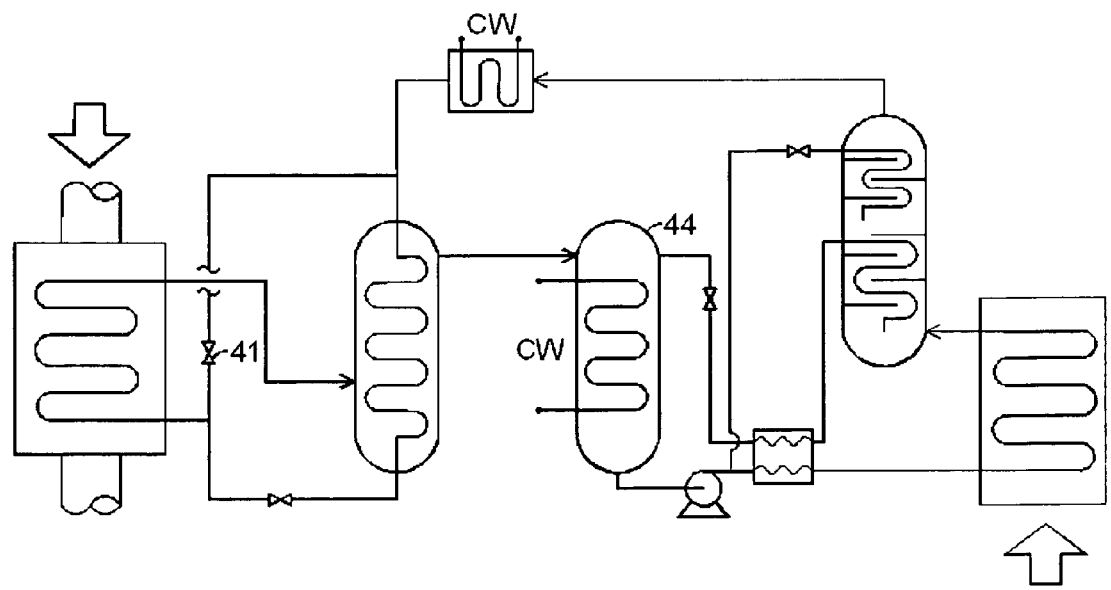
FIG. 4 illustrates another preferred approach to changing to heating mode.

Provided the inlet air heating duty is never more than about 10 to 15% of the design chilling duty, there is an even simpler method of providing that heat with this thermally activated chilling apparatus. That is illustrated in FIG. 4. On cold days, the condensing temperature is regulated at very roughly 100° F. (or roughly 55° F. above the desired inlet air temperature, and corresponding to about 200 psig condenser pressure). That can be done, for example, by turning off the condenser fans, reducing the solution pump flow, and/or using a bypass damper to control the amount of heat entering the heat recovery unit. For heating mode, a liquid refrigerant valve 41 is provided which allows the refrigerant to bypass the refrigerant heat exchanger 44 (RHX), thus carrying all the sensible heat into the exchanger. The absorber pressure would be controlled at approximately 100 psig, i.e. the saturation pressure corresponding to 65° F. condensing temperature in the air exchanger, i.e. about 20 F above the desired inlet air temperature. Roughly 10% of the liquid refrigerant will flash as it goes through the expansion valve, and then that flash vapor will re-condense in the exchanger. With this embodiment, the condenser pressure is maintained as high as about 200 psig in the heating mode. Liquid refrigerant flow can be advantageously controlled by condenser receiver level or other means.

Figure 5:
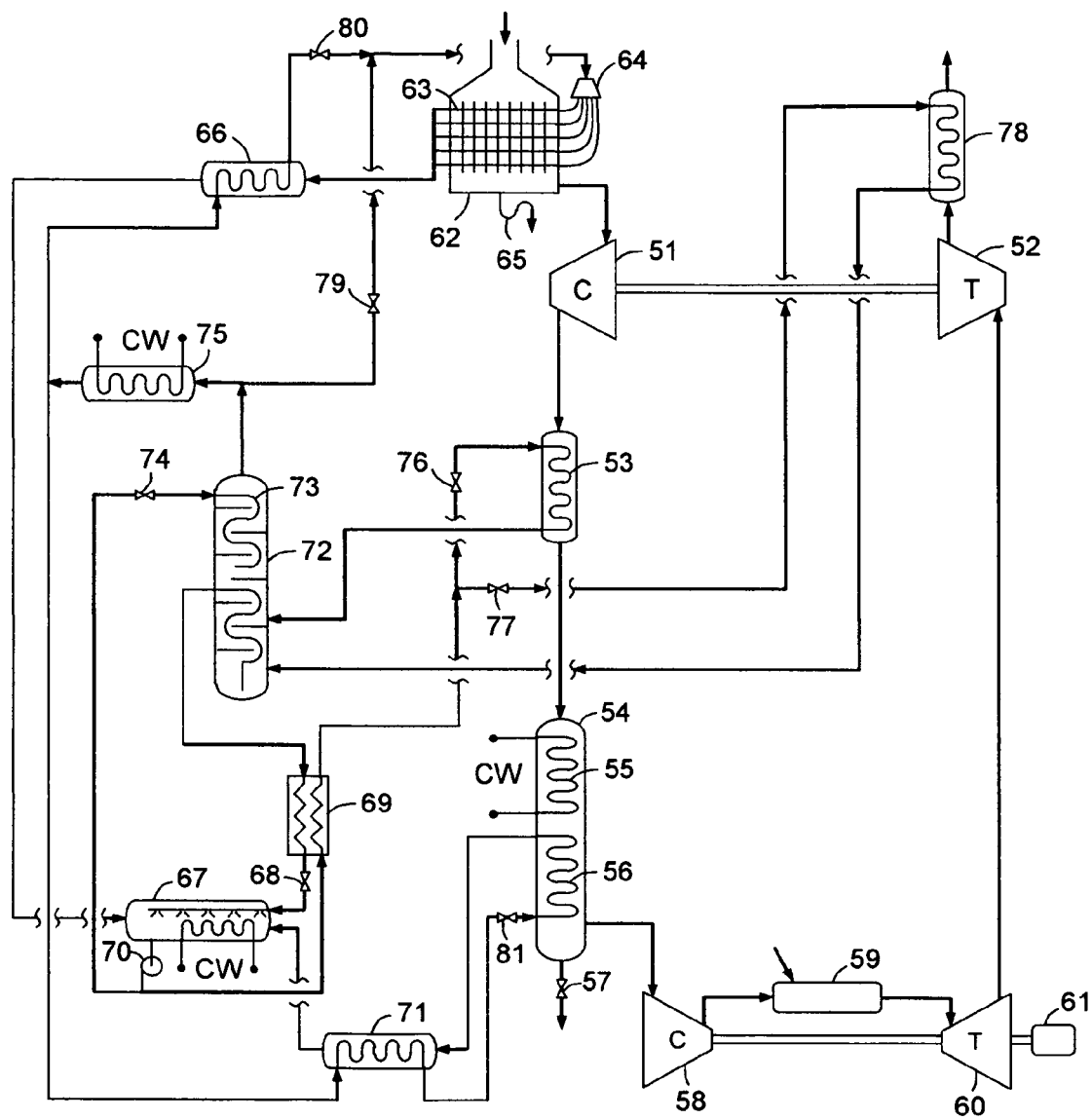
FIG. 5 illustrates an intercooled combustion turbine arrangement, wherein waste heat powered chilling is applied to either or both of the inlet air and the partially compressed intermediate pressure air, and the inlet air chiller is convertible to an inlet air heater.

Referring to FIG. 5, an intercooled combustion turbine system is depicted comprised of first compressor section 51 and final turbine section 52, plus a multi-component intercooler comprised of heat recovery section 53, and heat rejection section 54, the latter comprised of a cooling water cooled section 55 plus a chilled section 56. Condensed moisture from the cooling and chilling is controllably removed from the chilled air by control 57, and the chilled and compressed air is routed to second stage compressor 58. The compressed air then enters combustor 59 where it supports combustion of the fuel (gaseous or liquid). The hot gas expands in hot turbine 60, and then further expands in final turbine 52, with at least one turbine providing useful work output (beyond compression duty) at generator 61. The inlet air to compressor 51 is conditioned in inlet housing 62, comprised of a chilling/heating coil 63, a refrigerant distributor 64, and a trap 65 for removal of condensed water. In chilling mode, the cold refrigerant vapor from coil 63 is warmed in subcooler 66 while precooling the liquid supply refrigerant, and then the warmed vapor is absorbed in absorber 67. Absorbent liquid is supplied to absorber 67 via control valve 68, after being cooled in solution heat exchanger 69. After absorption, pump 70 sends the absorbed liquid to the overhead of distillation column 72, via control valve 74, and to heat recovery unit 53, via control valve 76. If insufficient heat is available in heat recovery unit 53 additional heat can be obtained from exhaust heat recovery unit 78, by sending pumped solution to it via control valve 77. Solution cooled rectifier 73 is a preferred means of supplying the necessary reflux liquid to column 72, i.e. via non-adiabatic distillation, or heat exchange on the trays. The overhead ammonia vapor from column 72, which has been rectified to only about 1 to 2% water vapor, is condensed to liquid in condenser 75, which is cooled by cooling water (or other source of ambient cooling). The refrigerant liquid is then divided, with part going to the inlet chiller 63 via subcooler 66 and expansion valve 80, and the remainder to interchiller 56, via subcooler 71 and expansion valve 81.

Water removal control valve 57 preferably is actuated by a water sensor such as a float mechanism whereby only water is removed, and compressed air is not allowed to escape. The two compressor sections and the two or three turbine sections can be configured in a variety of ways. FIG. 5 depicts in essence a standalone turbocharger in front of the combustion turbine. However all components can be mounted on a single shaft, or on two concentric shafts, as known in the art, for example the LMS 100 gas turbine. When the compression ratio of the first stage compressor 51 is at least about 2.8, the usable heat available at recovery unit 53 is sufficient to chill either coil 56 or 63, but not both, and hence supplementary heat is required, i.e. from recovery unit 78. When the compression ratio of compressor 51 is above about 4.5, the heat from recovery unit 53 alone is sufficient to produce both chilling duties. Note that it is particularly desirable to obtain the necessary heat to power the chiller from unit 53, as that heat needs to be removed anyway, and the higher pressure makes for a more compact heat exchanger with more allowable pressure drop. Also, it leaves all the exhaust heat for cogeneration or a bottoming cycle. On the other hand, for simple cycle arrangements, it may be desirable to obtain at least some of the heat from exhaust recovery unit 78, as that will supply desirable cooling of the exhaust to protect the SCR catalyst from overtemperature.

FIG. 5 illustrates a preferred method of converting the inlet chilling function to inlet heating when necessary to preclude icing in the bellmouth. To enter the anti-icing mode, liquid control valve 80 is shut, and vapor valve 79 is opened. Then the cooling supply to absorber 67 is regulated to maintain the low side pressure downstream of coil 63, whereby that coil becomes a condenser, heating the air to the desired temperature. For example, suppose the entering air is at 28° F., and it is desired to heat it to 38° F., and to do that the ammonia condensing temperature in coil 63 needs to be at 47° F. Then the absorber cooling would be regulated to maintain a low side pressure of about 84 psia (69 psig), which is the saturation pressure for ammonia condensing at 47° F. Note that it is desirable to provide excess ammonia vapor to coil 63, such that some vapor returns to absorber 67, providing better temperature and pressure control. In this heating mode, high side pressure should be maintained sufficiently above low side pressure to provide good vapor flow to the heating coil, e.g. 150 to 250 psig, and low side pressure as above, e.g. 50 to 100 psig. This very simple method of converting the chilling system to heating duty works especially well when the chilling coil is designed to be self-draining, i.e. does not have liquid upflow paths.

We claim:

1. A thermally-activated chilling/heating system for combustion turbine inlet air comprised of
   a) An inlet air heat exchanger;
   b) A heat recovery unit for transferring turbine waste heat to a thermally-activated chiller/heater;
   c) A chilling fluid Control for selectively supplying chilling fluid from said chiller/heater to said heat exchanger during warm conditions; and
   d) A heating fluid control for selectively supplying heating fluid from said chiller/heater to said heat exchanger during potential icing conditions.

2. The apparatus according to claim 1 wherein said chilling fluid control is a liquid refrigerant flow control valve, and said heating fluid control is a vapor flow control valve.

3. The apparatus according to claim 2 wherein said thermally activated chiller/heater is an ammonia absorption refrigeration unit that is comprised of at least one absorber, and the chilling fluid is liquid ammonia refrigerant which evaporates in said heat exchanger, and the heating fluid is ammonia vapor which condenses in said heat exchanger.

4. The apparatus according to claim 3 additionally comprising a conduit for supplying aqueous ammonia solution to said heat recovery unit for desorption therein.

5. The apparatus according to claim 3 additionally comprised of a control valve for controllably removing condensed refrigerant from said heat exchanger in heating mode and supplying it to said absorber.

* * * * *